United States Patent [19]

Pröhl et al.

[11] Patent Number: 4,504,843

[45] Date of Patent: Mar. 12, 1985

[54] SURFACE STRUCTURE FOR THE DRUM OF A RECORDING DEVICE

[75] Inventors: Hans-Rüdiger Pröhl, Radolfzell; Bernd Schmidt, Plochingen; Hans-Peter Spannehl, Schortens, all of Fed. Rep. of Germany

[73] Assignee: Contraves GmbH, Haar, Fed. Rep. of Germany

[21] Appl. No.: 399,238

[22] Filed: Jul. 19, 1982

[30] Foreign Application Priority Data

Aug. 26, 1981 [CH] Switzerland ........................ 5493/81

[51] Int. Cl.[3] ............................................ G01D 15/34

[52] U.S. Cl. ...................................... 346/138; 226/95; 271/276

[58] Field of Search ................ 346/138; 271/276, 196, 271/194; 226/95

[56] References Cited

U.S. PATENT DOCUMENTS

| | | | |
|---|---|---|---|
| 3,630,424 | 12/1971 | Rau | 226/95 OR |
| 4,294,539 | 10/1981 | Spehrley, Jr. | 226/95 X |

FOREIGN PATENT DOCUMENTS

| | | |
|---|---|---|
| 2109237 | 9/1972 | Fed. Rep. of Germany . |
| 3000887 | 8/1980 | Fed. Rep. of Germany . |
| 2192914 | 2/1974 | France . |
| 2410619 | 6/1979 | France . |

OTHER PUBLICATIONS

Article of R. M. Glowa et al., *IBM Technical Disclosure Bulletin,* Entitled: "Vacuum Transport Drum", vol. 19, No. 5, Oct. 1976, New York, pp. 1645–1646.

*Primary Examiner*—A. D. Pellinen
*Assistant Examiner*—Todd E. DeBoer
*Attorney, Agent, or Firm*—Werner W. Kleeman

[57] ABSTRACT

A recorder contains a rotatably mounted drum which is structured as a vacuum or negative pressure-hollow cylinder. At the cylindrical circumferential surface of the drum body there is arranged at least one clamping or supporting region for the retention of a sheet-shaped record carrier or medium, each clamping or supporting region containing a closed channel system. Each individual channel system comprises a number of channels of a first group of channels which are arranged in the lengthwise axial direction of the drum and essentially parallel to a clamping portion and a number of channels of a second group of channels arranged essentially transversely with respect to the first group of channels. In order to obtain a stable smooth contact or support of the record carrier or medium at the drum there is provided in the last channel of the related clamping or supporting region, which is arranged parallel to the clamping portion, an opening which penetrates through the drum body. For the smooth contact of the marginal zone of the record carrier there is provided parallel to the last channel a further channel containing branch channels arranged transversely thereto as well as openings.

5 Claims, 9 Drawing Figures

FIG. 1
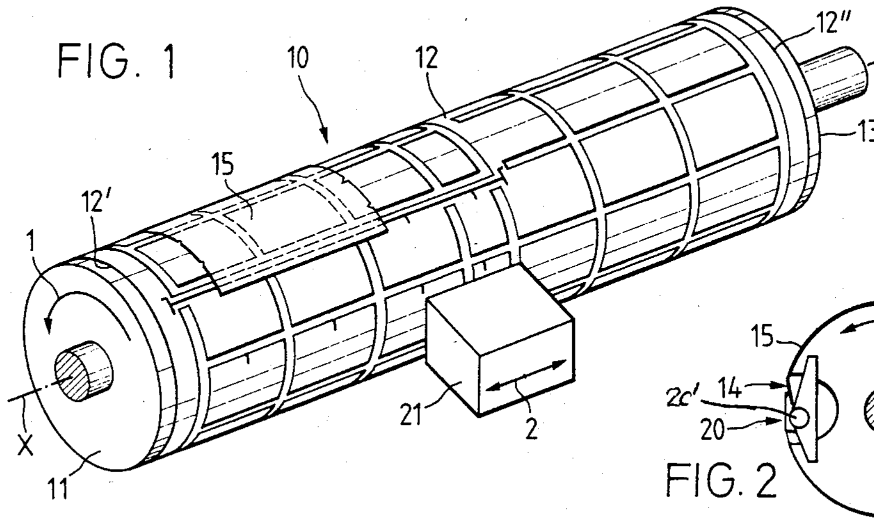
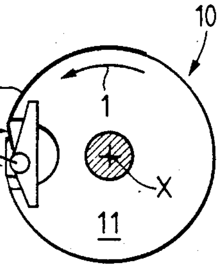
FIG. 2
FIG. 3
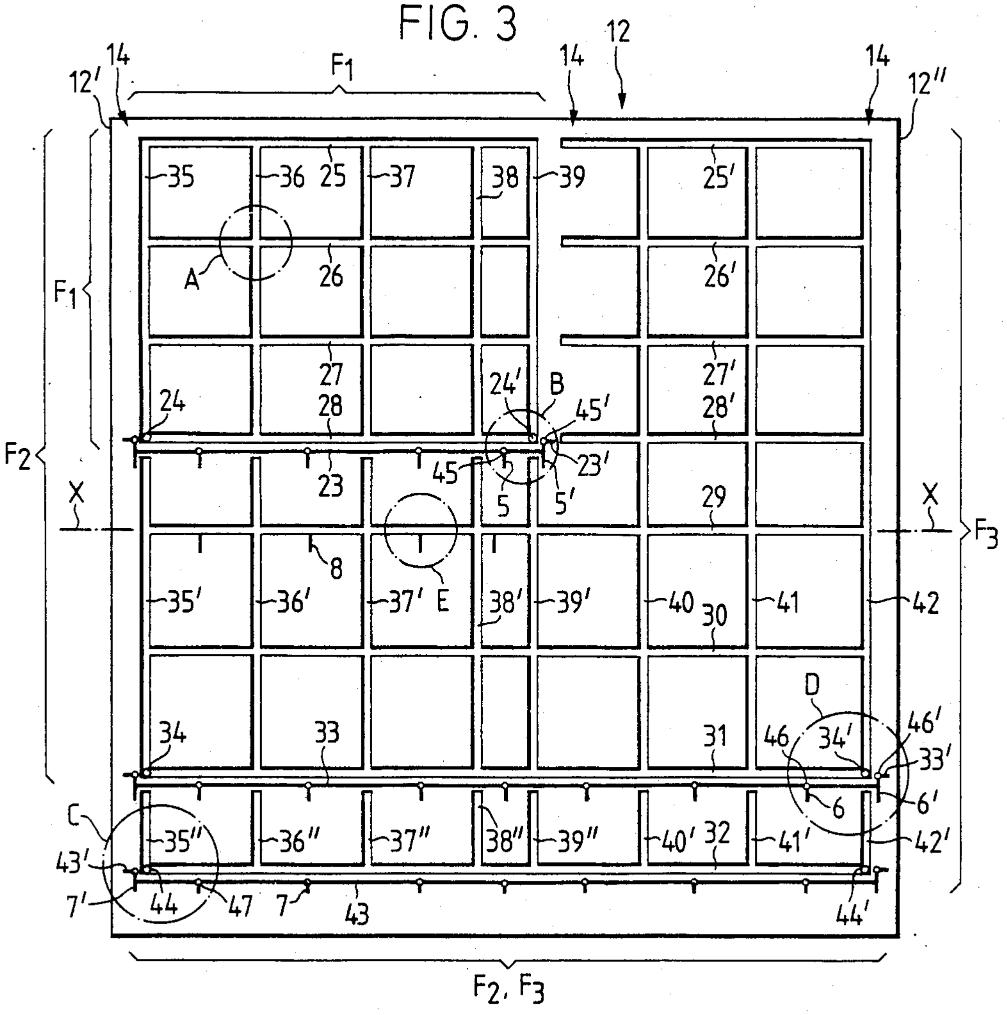

SURFACE STRUCTURE FOR THE DRUM OF A RECORDING DEVICE

BACKGROUND OF THE INVENTION

The present invention broadly relates to recording devices or recorders, and, more specifically, concerns a new and improved surface structure for the drum of a recorder.

Generally speaking, the drum of the recorder is constructed as a negative pressure-hollow cylinder which is mounted to be rotatable about its lengthwise axis within a recorder. At the outer cylindrical circumferential surface of the drum body there is provided a clamping portion arranged essentially parallel to the lengthwise axis of the drum and serving for the retention of a sheet-like record carrier. Additionally, at the outer cylindrical circumferential surface of the drum body there are provided a plurality of channels which extend essentially parallel to the clamping portion, these channels being distributively arranged at the circumference of the drum body and flow communicating by means of openings with the interior of the drum.

In U.S. Pat. No. 4,101,018, granted July 18, 1978 there is disclosed a drum for a recording device which is constructed as a hollow cylinder and operatively connected with a suction device. At the outer circumferential surface of the drum jacket there are provided uniformly distributed channels arranged parallel to the lengthwise axis of the drum and in each individual channel there are provided a number of bores which penetrate the drum jacket or shell and are arranged at a spacing with respect to one another. By means of the negative pressure prevailing at the outer circumferential surface of the drum jacket a sheet-like record carrier or medium is retained at the outer circumference of the drum.

In German Patent Publication No. 3,000,887, published Aug. 7, 1980 and the corresponding U.S. Pat. No. 4,285,507, granted Aug. 25, 1981, there is disclosed a recorder constructed as an ink jet printer. A drum is provided for retaining a sheet-like record carrier. The drum is provided with internal chambers which communicate with a vacuum line and with a number of openings uniformly distributed at the circumference of the drum. These openings are arranged in a row in the axial direction of the drum and penetrate through the drum jacket or shell. By means of these openings there can be applied a negative pressure to the outer circumferential surface of the drum, by means of which there can be retained the record carrier bearing at the circumference of the drum.

With the state-of-the-art drum constructions there is required a relatively high suction capacity of the suction device in order to realise a stable position of the record carrier or medium at the cylindrical drum surface. Particularly when there are being handled smaller record carriers or mediums which bear at the drum surface over a limited lengthwise extent and throughout a limited angular region the openings and channels which are not covered by the record carrier suck-up a relatively large amount of air. Consequently, there is required a high suction output, and thus, a large size suction device. Additionally, with the heretofore known constructions of drums there is not insured for a reliable contact of the record carrier at its end region.

SUMMARY OF THE INVENTION

Therefore, with the foregoing in mind it is a primary object of the present invention to provide a new and improved construction of drum for a recorder which is not associated with the aforementioned drawbacks and limitations of the prior art constructions.

Another and more specific object of the present invention is directed to constructing the cylindrical surface of a drum of a recorder in such a manner that with essentially constant suction output it is possible to also firmly and reliably clamp record carriers or mediums having different dimensions, and additionally, even with high rotational speeds of the drum, particularly also during the recording or plotting operation, there is insured for a stable position and a smooth and snug bearing of the record carrier at the drum. Yet a further significant object of the present invention is directed to a new and improved surface structure for a drum of a recorder which affords positive retention of the record medium at the surface of the drum.

Now in order to implement these and still further objects of the invention, which will become more readily apparent as the description proceeds, the drum for a record carrier as contemplated by the present development is manifested by the features that:

(a) at least one clamping region for the record carrier and provided with a closed channel system is arranged at the cylindrical circumferential surface of the drum body;

(b) the individual channel system contains a number of channels of a first group of channels which are arranged parallel to one another and extend in the axial lengthwise direction of the drum body as well as a number of channels arranged transversely thereto of a second group of channels; and (c) at least one opening which penetrates through the drum body is only provided in the last channel of the first channel group of the corresponding clamping region which is operatively associated in parallel spaced relationship to the clamping portion.

According to a further feature of the invention the last channel of the first channel group of each clamping or supporting region is provided with an additional channel arranged in the axial lengthwise direction of the drum as well as with a number of branch or side channels opening into the additional channel and arranged in spaced relationship from one another, these branch channels being equipped with appropriately arranged openings which piercingly extend through the drum body. With this design there can be obtained a smooth and firm contact of the end regions of the record carrier or medium, especially also even if there are encountered tolerance fluctuations in the dimensions of the record carrier or medium.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a schematic perspective view of a drum for a recorder and constructed with the surface structure of the invention;

FIG. 2 is an end view of the drum depicted in FIG. 1 schematically illustrating a clamping and declamping device for a sheet-like record carrier or medium;

FIG. 3 is a development view of the drum body of the drum shown in the arrangement of FIG. 1 and schematically depicting the surface structure thereof;

DETAILED DESCRIPTION OF THE PREFERRED EMBODIMENTS

Figure 4:
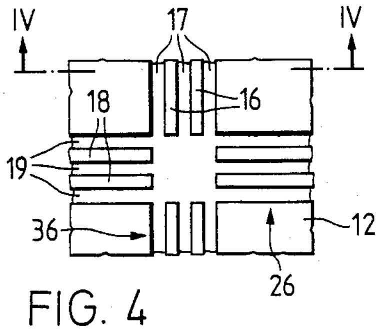
FIG. 4 is a fragmentary detail view, on an enlarged scale, of the location or portion of the drum depicted in FIG. 3 and marked by a circle A.

Describing now the drawings, it is to be understood that for the purpose of simplifying the illustration only enough of the construction of the recorder or recording device has been depicted in the drawings as needed for those skilled in this art to readily understand the underlying principles and concepts of the present development. Turning attention now specifically to FIG. 1, there has been schematically illustrated therein in perspective view a drum or drum member 10 which is arranged in the here not further specifically shown recorder for a liquid jet printer. The drum 10 is mounted to be rotatable in the direction of the arrow 1 about its lengthwise axis X. Additionally, by inspecting FIG. 1 there will be seen a portion of a sheetlike record carrier or medium 15 which has been clamped upon the surface of the drum 10 and the schematically depicted ink writing head 21 which is appropriately operatively correlated with the drum 10 and can be displaced parallel to the drum 10 with the aid of any suitable means in the direction of the double-headed arrow 2, such displacement means not having been shown since the same are unimportant for understanding the principles of the invention and do not constitute subject matter of the same. The drum or drum member 10 essentially comprises a first drum base or floor 11, a drum body 12 and a second drum base or floor 13. The hollow cylindrical drum body 12 is arranged at the one end or rim 12′ at the drum base 11 and at the other rim or end 12″ at the drum base or floor 13 and is secured thereto by any suitable attachment means.

FIG. 2 shows in side view the drum 10 and there will be specifically recognized an end view of the first drum base or floor 11, a schematically depicted clamping and declamping device 20, and the record carrier or medium 15 which is retained by means of the clamping device 20. At the outer surface of the drum body 12 there is provided a clamping portion 14 for the record carrier or medium 15. This clamping portion 14 is oriented so as to extend essentially parallel to the lengthwise axis X of the drum 10 and is operatively correlated with the clamping and declamping device 20 allowing for the selective retention and release of the sheet-like record carrier 15. The clamping and declamping device 20 which is operatively associated with the drum 10 is mounted by means of the shaft 20′ at both drum bases or floor portions 11 and 13. This shaft 20′ extends essentially parallel to the lengthwise axis X of the drum or drum member 10.

Turning attention now to FIG. 3 there has been shown therein details of the novel surface structure of the drum 10. The drum body 12 which is fabricated, in the illustrated exemplary embodiment, from a seamless cylindrical tube or pipe member, has been shown in development view in such FIG. 3. Specifically, there will be recognized the surface structure which, in the embodiment under discussion, essentially is sub-divided into three supporting or clamping regions $F_1$—$F_1$, $F_2$—$F_2$ and $F_3$—$F_3$ which have been dimensioned in accordance with the momentary record carrier 15 which is to be clamped at the drum 10. The clamping or supporting regions $F_1$—$F_1$, $F_2$—$F_2$ and $F_3$—$F_3$ which are arranged at the surface of the drum body 12, in each case encompass a number of channels 25, 26, 27, 28, 29, 30, 31 and 32 which form a first group of channels or channel group and are arranged essentially parallel to the drum-lengthwise axis X as well as a number of channels 35, 36, 37, 38, 39, 40, 41 and 42 arranged transversely with respect to the first mentioned channels 25 to 32 and constitute a second group of channels or channel group. The channels 25 to 32 of the first channel group and the channels 35 to 42 of the second channel group are arranged in each case in spaced relationship with respect to one another.

The first clamping region $F_1$—$F_1$ encompasses the channels 25–28 arranged parallel to the clamping or securing portion 14 as well as the channels 35–39 arranged transversely with respect to the channels 25–28, and which collectively form a first closed channel system.

On the one hand, the second clamping region $F_2$—$F_2$ encompasses the channels of the first clamping region $F_1$—$F_1$ and, on the other hand, further channels 25′, 26′, 27′, 28′, 29, 30 and 31 appropriately arranged with respect to the channels of the first clamping region as well as the channels 35′, 36′, 37′, 38′, 39′, 40, 41 and 42 arranged transversely thereto, which collectively form a second closed channel system. The channels 25′, 26′, 27′and 28′of the second clamping region $F_2$—$F_2$ and arranged parallel to the clamping portion 14 are disposed in spaced relationship to the corresponding channels 25, 26, 27 and 28 of the first clamping or supporting region $F_1$—$F_1$.

The third clamping region $F_3$—$F_3$ encompasses the channels of both clamping regions $F_1$—$F_1$ and $F_2$—$F_2$ and additionally a channel 32 which is parallel to the channel 31 as well as the channels 35″, 36″, 37″, 38″, 39″, 40′ and 42′ arranged transversely thereto, which form a third closed channel system. The channels 35″ to 42′ are arranged in spaced relationship to the corresponding channels 35′, 36′, 37′, 38′, 39′, 40, 41 and 42 of the second clamping region $F_2$—$F_2$.

As will be readily seen by referring to FIG. 3, in the last channel 28 correlated to the clamping region $F_1$—$F_1$ there are provided openings 24 and 24′ which are arranged in spaced relationship to one another. In the last channel 31 correlated to the clamping region $F_2$—$F_2$ there are provided openings 34 and 34′ arranged in spaced relationship to one another, and in the last channel 32 correlated to the clamping region $F_3$—$F_3$ there are provided openings 44 and 44' which are arranged in spaced relationship to one another. The openings 24, 24', 34, 34', 44 and 44', constructed as through-pass bores or continuous holes, piercingly penetrate the drum body 12 and flow communicate with the interior of the drum or drum member 10. In the illustrated exemplary embodiment there are provided two respective openings in the channels 28, 31 and 32, which viewed in the direction of the lengthwise axis X of the drum 10 are arranged in each case at the start and at the end of the corresponding clamping region. However, the possibility also exists of providing in the channels 28, 31 and 32, in each case only one or however a number of distributively arranged openings.

To obtain a faultless smooth and snug contact of the end regions of the record carrier there is operatively correlated with the last channel 28, 31 and 32 of the relevant clamping regions $F_1$—$F_1$, $F_2$—$F_2$ and $F_3$—$F_3$ a respective groove-shaped channel 23, 33 and 43 as well as a number of branch channels 5, 6 and 7 arranged in spaced relationship from one another and opening into the related channel. At the end region of the channels 23, 33 and 43 arranged essentially parallel to the channels 28, 31 and 32 there are provided at both sides offset arranged channel sections 23', 33' and 43', each of which are connected by a branch channel 5', 6' and 7' with the corresponding or related channel. At the intersection locations of the channels 23, 33 and 43 with the branch channels 5, 6 and 7 there is provided a respective bore 45, 46 and 47 which piercingly extends through the drum body 12. At the channel 29 of the second clamping region $F_2$—$F_2$, as best seen by referring to FIG. 3, there are provided in the section extending parallel to the channel 28 of the first clamping region $F_1$—$F_1$ branch channels 8 arranged in spaced relationship from one another and opening into the channel 29.

At this point it is mentioned that for reasons of enhancing clarity in the illustration the branch channels 5, 6, 7 and 8 merging with the channels 23, 33, 43 and 29, respectively, as well as the bores 45, 46 and 47 in each case have only once been designated with a position number. In the description to follow there will be described details of the channels and branch channels which have been illustrated in an enlarged scale in FIGS. 4 to 8.

Figure 4A:
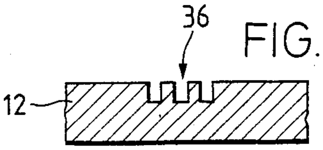
FIG. 4*a* is a sectional view of the arrangement of FIG. 4, taken substantially along the section line IV—IV thereof.

In FIG. 4 there is shown in a fragmentary view the location A highlighted in FIG. 3 by a circle and constituting an exemplary embodiment for all intersecting channels of the first and second channel groups which are arranged at the drum body 12. Specifically, there will be recognized the channel 26 subdivided by webs 18 and grooves 19 as well as the channel 36 arranged transversely thereto and subdivided by webs 16 and grooves 17. In FIG. 4a there has been shown in cross-sectional view, along the section line IV—IV of FIG. 4, the channel 36 arranged at the drum body 12.

Figure 5:
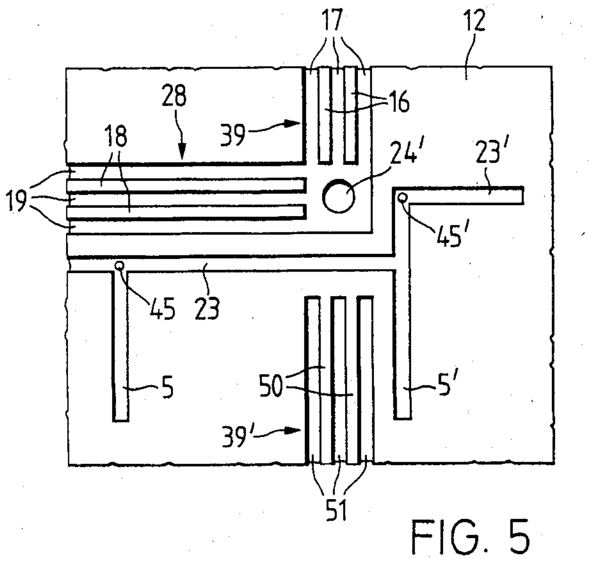
FIG. 5 is a detail showing, again on an enlarged scale of the location of the portion of the drum depicted in FIG. 3 and designated by a circle B.

FIG. 5 is a detail illustration of the location B designated by a circle in FIG. 3 and, specifically, there will be recognized the channel 28 subdivided by the grooves 19 and webs 18 as well as the channel 39 subdivided by the grooves 17 and webs 16. At the corners of both channels 28 and 39 there are not provided any webs. At this location there is arranged the opening 24' which piercingly extends through the drum body 12 and, in the illustrated exemplary embodiment, is constructed as a bore or hole.

Arranged parallel to the channel 28 is the groove-shaped channel 23 at which merges the branch channels 5 which are arranged distributively with respect to one another. At the joint location or the interface of the channel 23 with the branch channels 5 there is provided a respective bore 45 which pieringly extends through the drum body 12. Additionally, there will be recognized by further inspecting FIG. 5 the branch channel 5' arranged laterally at the channel corner 28, 39 and the channel section 23' containing the bore 45' and arranged offset with respect to the channel 23. Additionally, a portion or section of the channel 39' of the second clamping region $F_2$—$F_2$ is shown in FIG. 5 and located in spaced relationship from the channel 23. At the channels 25 to 28 of the first clamping region $F_1$—$F_1$ there are generally designated by reference numeral 18 the webs, by reference numeral 19 the grooves, and in the channels 35 to 39 arranged transversely thereto the webs have been generally designated by reference character 16, whereas the grooves have been generally designated by reference character 17.

Figure 6:
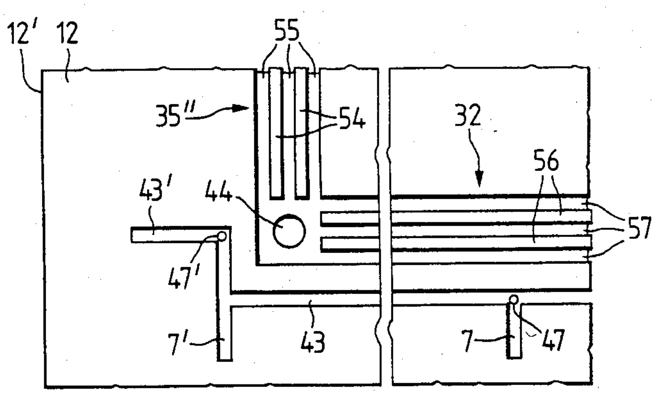
FIG. 6 is an enlarged detail showing of a further portion of the drum depicted in FIG. 3, and specifically location designated by the circle C.
Figure 7:
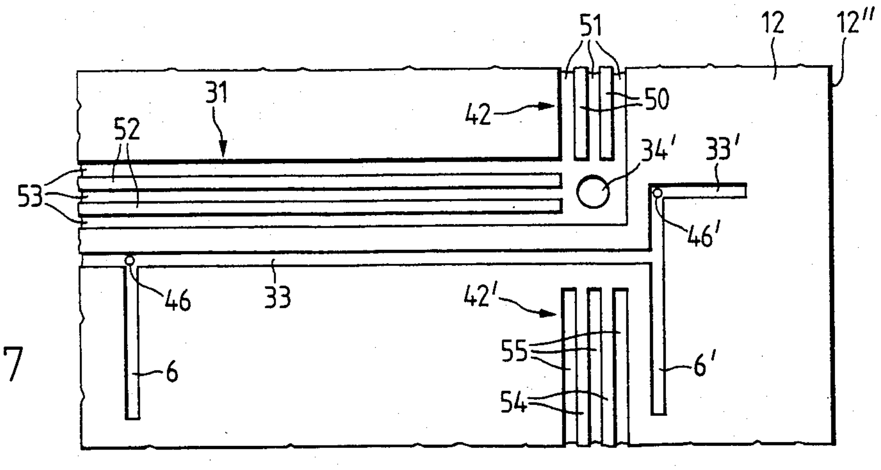
FIG. 7 is a detail showing, likewise on an enlarged scale, of the portion or location of the drum depicted in FIG. 3 and designated by the circle D.

FIG. 6 illustrates a detailed showing of the location C enclosed within a circle in the arrangement of FIG. 3, whereas in FIG. 7 there has been illustrated a detail of the location D located within a circle in the arrangement of FIG. 3, which essentially are constructed analogous to the location B of the arrangement of FIG. 5, and therefore need not here be further described in detail.

In the channels of the second clamping region $F_2$—$F_2$ there have been designated generally by reference numeral 52 the webs arranged in the channels 25' and 28' and 29 to 31, the grooves have been generally designated by reference numeral 53, and in the channels 35' to 39' and 40 to 42 arranged transversely thereto the webs have been generally designated by reference numeral 50 and the grooves generally designated by reference numeral 51 (FIG. 7).

In the channels of the third clamping region $F_3$—$F_3$ the webs arranged in the channel 32 have been generally designated by reference numeral 56, the grooves generally by reference numeral 57, and in the channels 35'' to 39'' and 40' to 42' arranged transversely thereto the webs have been generally designated by reference numeral 54 and the grooves have been generally designated by reference numeral 55 (FIG. 6).

Figure 8:
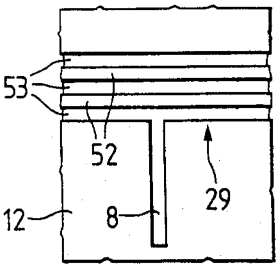
FIG. 8 is a detail showing, also on an enlarged scale, of the location of the drum depicted in FIG. 3 within the circle E.

Finally, FIG. 8 illustrates a detail of the location E enclosed within a circle in the arrangement of FIG. 3. Specifically, there will be recognized the channel 29 of the second clamping region $F_2$—$F_2$ subdivided by the grooves 53 and webs 52 as well as the branch channel 8 opening into the channel 29.

While there are shown and described present preferred embodiments of the invention, it is to be distinctly understood that the invention is not limited thereto, but may be otherwise variously embodied and practiced within the scope of the following claims. Accordingly,

What we claim is:

1. A drum member for use in a recorder, comprising:

a drum body mounted to be rotatable about its lengthwise axis in the recorder and constructed as a hollow cylinder intended to be subjected to a vacuum;

said drum body having an outer cylindrical circumferential surface for retaining a sheet-like record carrier thereat;

said outer cylindrical circumferential surface of said drum body possessing a clamping portion arranged essentially parallel to the lengthwise axis of the drum body;

a plurality of channels extending substantially parallel to said clamping portion and distributively arranged at the circumferential surface of the drum body;

at least one clamping region for the record carrier arranged at the cylindrical circumferential surface of said drum body;

a closed channel system provided for said clamping region;

said closed channel system comprising a number of channels of a first channel group arranged essentially parallel to one another and extending in the axial lengthwise direction of the drum body;

said closed channel system further comprising a number of channels of a second channel group arranged transversely with respect to the channels of the first channel group;

said channels of said first channel group of a related clamping region including a last channel which is operatively correlated in parallel spaced relationship from said clamping portion;

only said last channel of said first channel group being provided with at least one opening piercingly extending through said drum body; and the channels of the first channel group arranged in the drum body and the channels of the second channel group arranged in the drum body are subdivided by mutually parallelly arranged webs and grooves.

2. The drum surface structure as defined in claim 1, wherein:

said cylindrical drum body is sub-divided into three clamping regions essentially limited by the last channels thereof; and at least at the start and end of the last channels there is provided a respective opening.

3. The drum surface structure as defined in claim 2, further including:

a channel arranged in parallel spaced relationship to the last channel of the first clamping region;

said channel arranged in parallel spaced relationship to said last channel being provided with branch channels arranged transversely thereto and equipped with openings flow communicating with the interior of said drum body.

4. The drum surface structure as defined in claim 2, further including:

a channel arranged in parallel spaced relationship to the last channel of the second clamping region; and said channel arranged in parallel spaced relationship to the last channel of said second clamping region being provided with branch channels arranged transversely thereto and flow communicating by means of openings with the interior of said drum body.

5. The drum surface structure as defined in claim 2, further including:

a channel arranged in parallel spaced relationship to the last channel of the third clamping region; and said channel which is arranged in parallel spaced relationship to said last channel of said third clamping region being provided with branch channels flow communicating by means of openings with the interior of said drum body.

* * * * *